US007825939B2

(12) United States Patent
Mukunashi

(10) Patent No.: US 7,825,939 B2
(45) Date of Patent: Nov. 2, 2010

(54) IMAGE REPRODUCING METHOD AND IMAGE REPRODUCING APPARATUS

(75) Inventor: Masayuki Mukunashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 11/347,418

(22) Filed: Feb. 3, 2006

(65) Prior Publication Data

US 2006/0177196 A1 Aug. 10, 2006

(30) Foreign Application Priority Data

Feb. 8, 2005 (JP) ............... 2005-032066

(51) Int. Cl.
*G06F 17/00* (2006.01)
(52) U.S. Cl. ............ 345/619; 345/672; 345/684; 345/642; 345/661
(58) Field of Classification Search ........ 345/418, 345/419, 428, 581, 589, 606, 619, 660, 642, 345/661, 672, 684
See application file for complete search history.

(56) References Cited

U.S. PATENT DOCUMENTS

| 5,555,068 | A | * | 9/1996 | Utagawa | 396/121 |
|---|---|---|---|---|---|
| 5,838,872 | A | * | 11/1998 | Kawara | 386/68 |
| 5,920,529 | A | * | 7/1999 | Ota et al. | 369/84 |
| 6,078,693 | A | * | 6/2000 | Kawamura et al. | 382/238 |
| 6,097,431 | A | * | 8/2000 | Anderson et al. | 348/231.7 |
| 6,283,764 | B2 | * | 9/2001 | Kajiyama et al. | 434/307 A |
| 6,292,273 | B1 | * | 9/2001 | Dow et al. | 358/473 |
| 6,538,698 | B1 | * | 3/2003 | Anderson | 348/333.05 |
| 6,700,612 | B1 | * | 3/2004 | Anderson et al. | 348/333.11 |
| 6,715,003 | B1 | * | 3/2004 | Safai | 710/33 |
| 6,734,909 | B1 | * | 5/2004 | Terane et al. | 348/333.05 |
| 6,943,842 | B2 | * | 9/2005 | Stavely et al. | 348/333.05 |
| 7,339,170 | B2 | * | 3/2008 | Deliwala | 250/351 |
| 7,339,622 | B2 | * | 3/2008 | Yokokawa | 348/333.01 |
| 2002/0063902 | A1 | * | 5/2002 | Dow et al. | 358/302 |
| 2002/0067420 | A1 | * | 6/2002 | Oeda et al. | 348/333.05 |
| 2003/0063198 | A1 | * | 4/2003 | Yokokawa | 348/231.2 |
| 2003/0086012 | A1 | * | 5/2003 | Stavely et al. | 348/333.05 |
| 2004/0085457 | A1 | * | 5/2004 | Thorland et al. | 348/220.1 |
| 2004/0145660 | A1 | * | 7/2004 | Kusaka | 348/211.2 |
| 2005/0052550 | A1 | * | 3/2005 | Sato | 348/231.2 |
| 2005/0146613 | A1 | * | 7/2005 | Silverbrook et al. | 348/207.2 |
| 2005/0160375 | A1 | * | 7/2005 | Sciammarella et al. | 715/838 |
| 2006/0132822 | A1 | * | 6/2006 | Walmsley | 358/1.14 |
| 2006/0192881 | A1 | * | 8/2006 | Sato et al. | 348/333.05 |

FOREIGN PATENT DOCUMENTS

| JP | 7-177456 A | 7/1995 |
|---|---|---|
| JP | 07-177457 A | 7/1995 |
| JP | 2001230992 A | 8/2001 |
| JP | 2004-153832 A | 5/2004 |

* cited by examiner

*Primary Examiner*—Xiao M Wu
*Assistant Examiner*—Abderrahim Merouan
(74) *Attorney, Agent, or Firm*—Canon U.S.A., Inc. I.P. Division

(57) ABSTRACT

An image reproducing apparatus determines the number of jumps in jump reproduction based on the number of images within a predetermined range recorded on a recording medium, reproduces from the recording medium an image specified by the determined number of jumps, and displays the reproduced image.

27 Claims, 7 Drawing Sheets

FIG.4
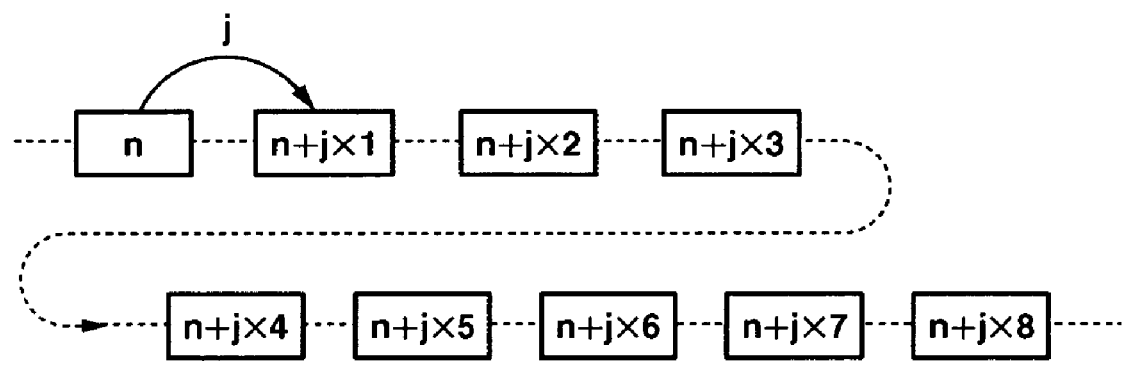
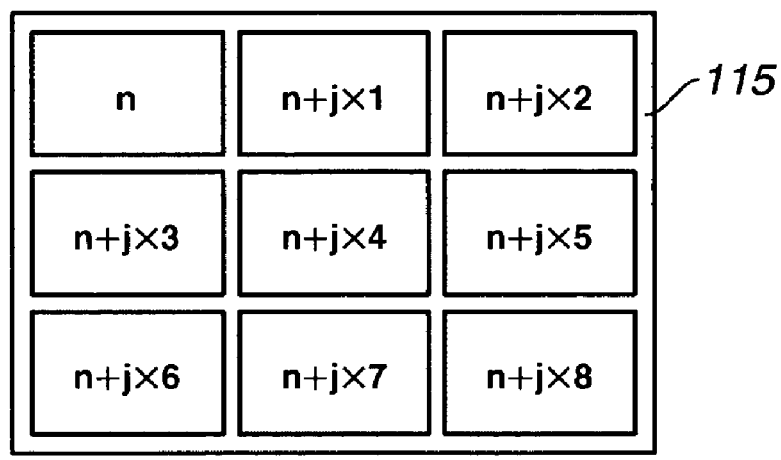

IMAGE REPRODUCING METHOD AND IMAGE REPRODUCING APPARATUS

BACKGROUND OF THE INVENTION

1. Field of the Invention

The present invention relates to an image reproducing method and an image reproducing apparatus for reproducing images that are recorded on a recording medium.

2. Description of the Related Art

Digital cameras that are widespread in use electronically process information on images taken and store the image information as image files in a recording medium such as a memory card, and the like. In addition, most of such digital cameras can display images with a built-in display (such as a liquid crystal display panel) or an external display connected to a video output terminal (such as a television set). By shifting recorded images forward/backward frame by frame in one operation, a user can search for and view a desired image file while checking images. There is also a digital camera with a jump function that enables display of an image that is N frames ahead or behind, rather than frame-by-frame display in one operation. With such a jump function, if a user is apparently aware that a desired image file is not located adjacent to a currently displayed image, the user can search for and view the desired image file with a fewer number of operations.

Recently, recording media have a pronounced tendency to shift to high capacity. As the tendency proceeds, the number of frames to be recorded in one recording medium is voluminously increasing. The voluminous increase in the number of frames impels the user to execute an operation of shifting frames forward/backward so many times so as to search for and view a desired image file, which causes cumbersome operations for the user.

Digital cameras with such a jump function are discussed in Japanese Patent Application Laid-Open No. 7-177456 and No. 2004-153832 (corresponding to U.S. Patent Application Publication No. US 2004/0085457 A1). More specifically, Japanese Patent Application Laid-Open No. 7-177456 discusses image shifting in which a user specified a number of frames to be jumped and the recorded images are shifted according to the number of frames to be jumped specified by the user. Japanese Patent Application Laid-Open No. 2004-153832 discusses a reproduction configuration in which a displayed image jumps to the first image or an initial screen in response to a user pressing an UP button and jumps to the last image or the initial screen in response to a user pressing a DOWN button.

However, in the conventional digital camera with a jump function, fixing the number of frames to be jumped as with the jump function discussed in Japanese Patent Application Laid-Open No. 7-177456, is a problem. This is because the number of frames to be jumped is sometimes too large or too small relative to the total number of recorded frames, which makes it inconvenient to search for a desired image.

In addition, with the jump function discussed in Japanese Patent Application Laid-Open No. 2004-153832 in which a displayed image simply jumps to the first or last image, a user more often ends up viewing through frame-by-frame advance if the number of images increases, which makes the operation cumbersome.

Furthermore, a user does not look at images closely in many cases when the user searches for a desired image from a large number of image files. Rather, as the user makes a search relying on a rough image, some decrease in image information is often permissible.

SUMMARY OF THE INVENTION

The present invention is directed to an image reproducing method and an image reproducing apparatus that can improve user operability to search for a desired image from a large number of image files.

According to one aspect of the present invention, an image reproducing method includes a determining step of determining a number of jumps in jump reproduction based on a number of images within a predetermined range recorded on a recording medium, and a displaying step of reproducing from the recording medium an image specified by the number of jumps determined in the determining step and displaying the reproduced image.

According to another aspect of the present invention, an image reproducing apparatus includes a determination unit configured to determine a number of jumps in jump reproduction based on a number of images within a predetermined range recorded on a recording medium; and a display unit configured to reproduce from the recording medium an image specified by the number of jumps determined by the determination unit and to display the reproduced image.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates a display example of jump multi-reproduction.

DETAILED DESCRIPTION OF THE EMBODIMENTS

Exemplary embodiments of the invention will be described in detail below with reference to the drawings.

First Embodiment

Figure 1:
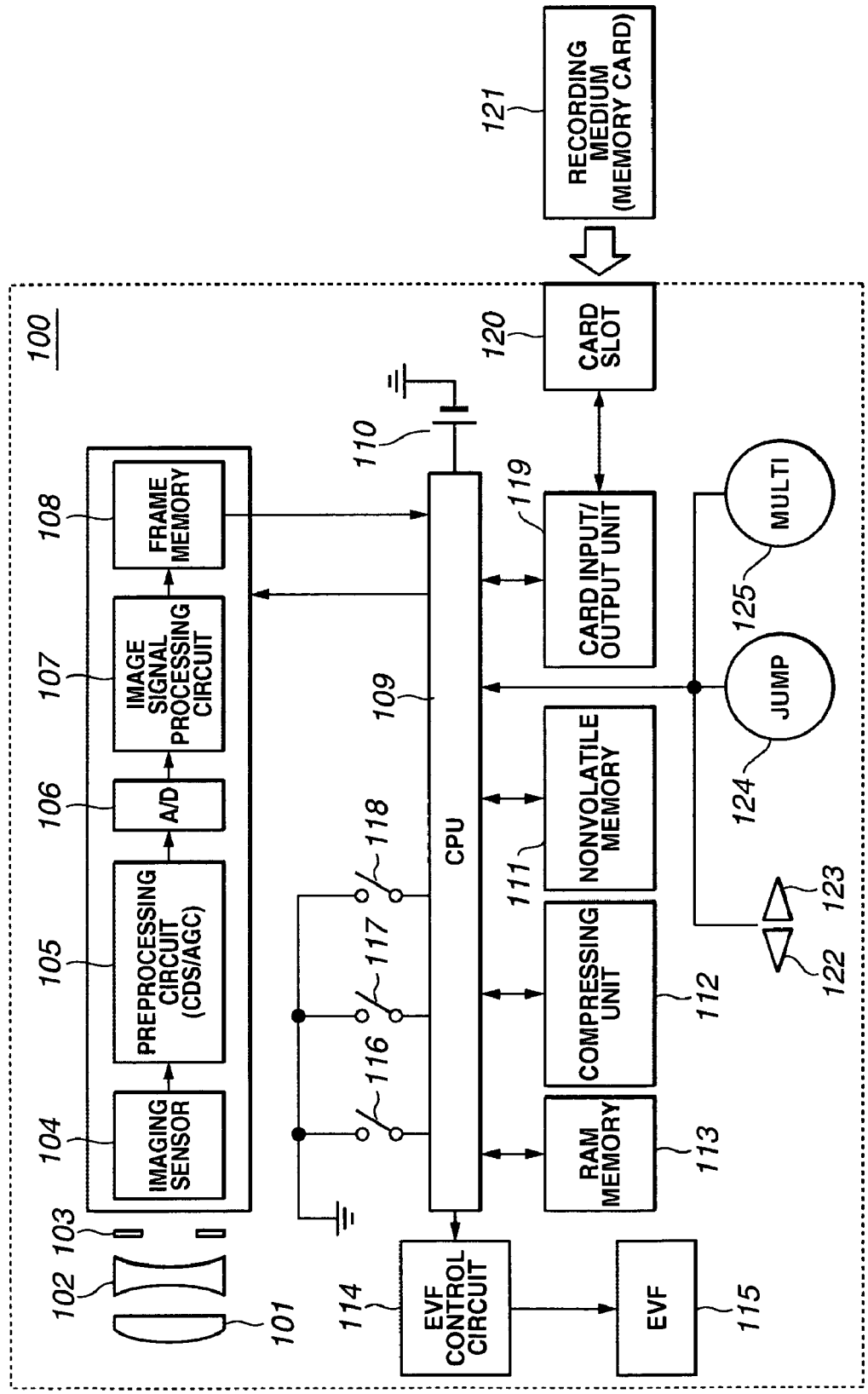
FIG. 1 is a block diagram of a digital camera according to a first embodiment.

FIG. 1 is an exemplary block diagram of a digital camera according to a first embodiment. In FIG. 1, the digital camera includes a digital camera body 100 that captures a subject image. A power supply 110 supplies power to respective circuits within the digital camera body 100. A memory card (a removable recording medium) 121 can be inserted into a card slot 120. With the memory card 121 inserted into the card slot 120, the memory card 121 is electrically connected with a card input/output unit 119. Although, as a recording medium, the memory card 121 is used in this embodiment, other recording media such as a hard disk, optical disk, magneto-optical disk, magnetic disk, and other solid-state memory may be used as well.

A focusing lens 101 adjusts focus by moving backward or forward in an optical axis direction and a zooming lens 102 changes magnification similarly by moving backward or forward in the optical axis direction. A diaphragm 103 adjusts the amount of light incident on an image sensor 104. The focusing lens 101, the zooming lens 102, and the diaphragm 103 constitute an imaging optical system.

The image sensor 104 is a charge-coupled device (CCD) image sensor that has a photoelectric conversion function. In addition, the image sensor 104 may include a complementary metal-oxide semiconductor (CMOS) image sensor. The image sensor 104 photoelectrically converts a subject image that is formed by the imaging optical system composed of optical elements 101 to 103, and outputs an image signal. A preprocessing circuit 105 includes a correlated double sampling (CDS) circuit and an automatic gain control (AGC) circuit, and the like, removes noise of an output image signal from the image sensor 104, and controls gain.

An A/D converter 106 converts an analog image signal output from the preprocessing circuit 105 into a digital image signal. An image signal processing circuit 107 performs image signal processing such as gamma correction and AWB (auto white balance), and the like, which is well known in camera technologies, on the digital image signal. The image signal processing circuit 107 corrects non-linearity of image density attributable to characteristics of the image sensor 104, and corrects deviation in image colors attributable to a light source. A frame memory 108 functions as a buffer memory that temporarily stores image signals generated by the image sensor 104 through the image signal processing circuit 107.

A section composed of the image sensor 104 through the frame memory 108 is a photoelectric conversion system that converts an optical image of a subject formed by the imaging optical system into a digital image signal or image data.

A power supply 110, a nonvolatile memory 111, a compressing unit 112, a RAM memory 113, an EVF control circuit 114, an EVF (electronic viewfinder) 115, a main switch 116, a first release switch 117, a second release switch 118, operation buttons 122 to 125, and a card input/output unit 119 are connected to a CPU 109 that controls the whole digital camera. The CPU 109 sends out a clock signal that controls read-out of an image signal from the image sensor 104, and controls operation timing of the image sensor 104 through the frame memory 108.

The non-volatile memory 111 is composed of an electrically erasable programmable read-only memory (EEPROM), and the like, and does not lose stored data even if the power supply 110 is turned off.

The compressing unit 112 compresses an inputted image signal to reduce the amount of data, in particular, the size of an image file.

The RAM memory 113 temporarily stores data when the CPU 109 executes various processes. The EVF control circuit 114 drives and controls the EVF 115, which is composed of a liquid crystal display element.

When a user turns on the main switch 116, the CPU 109 executes a predetermined program related to photographing. The first release switch 117 is turned on by a first stroke (half pressed condition) of the release button, and the second release switch 118 is turned on by a second stroke (fully pressed condition) of the release button. In addition, the CPU 109 executes or enables image right shift, image left shift, jump reproduction, and multi-display according to pressing of an image right shift button 123, an image left shift button 122, a jump button 124, and a multi-display button 125, respectively.

The card input/output unit 119 can send a command to the memory card 121 inserted into the card slot 120, and transmit or receive various data to or from the memory card 121. The memory card 121 is provided with the function of recording or saving compressed image signals, and is composed of a semiconductor memory such as a flash memory, a magnetic disk, an optical disk, or the like.

Basic operations associated with the operation buttons 122 to 125 of the embodiment are described next. When a user presses the image right shift button 123 during normal image reproduction, the next image is displayed. When the user presses the image left shift button 122, the previous image is displayed. The present embodiment assumes that a sequence of image display is that of photographing. If the user presses the image right shift button 123 while the latest image is displayed, the oldest image appears. If the user presses the image left shift button 122 while the oldest image is displayed, the latest image appears. When the user presses the jump button 124 during image reproduction, the digital camera enters an image jump shift mode.

Figure 2:
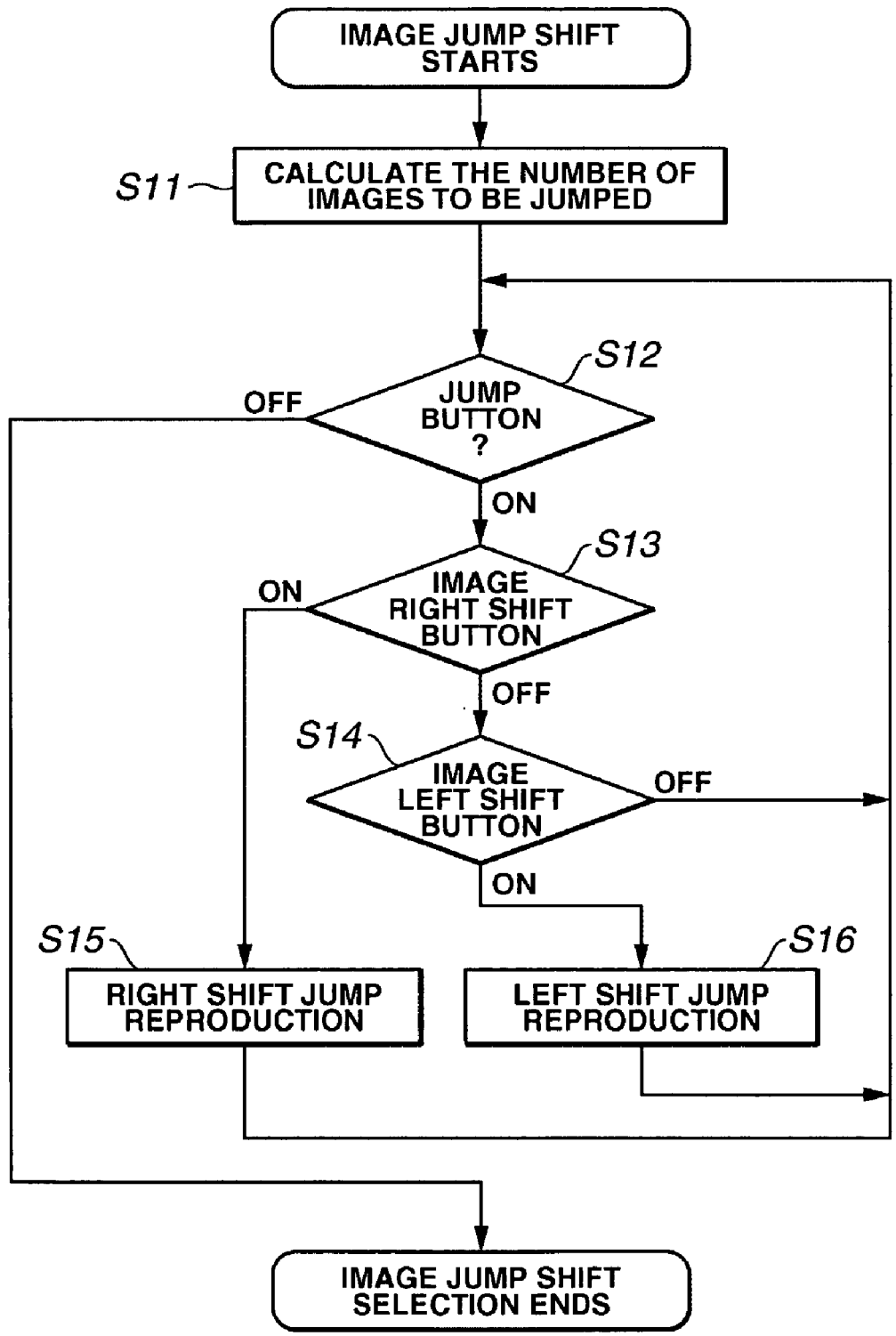
FIG. 2 is a flow chart illustrating determination of the number of images to be jumped and jump reproduction in the first embodiment.

FIG. 2 is a flow chart illustrating an image shift operation in the image jump shift mode in the embodiment. The image shift operation in the image jump shift mode will be described with reference to the flowchart shown in FIG. 2.

Based on a jump number table that describes a relationship between the total numbers of images to be reproduced and the numbers of images to be jumped and the total number N of images to be reproduced recorded in the non-volatile memory 111, the CPU 109 determines an applicable number J of images to be jumped (Step S11). In the embodiment, as the total number of images to be reproduced increases, the number of images to be jumped also increases. Such a correspondence relationship is contained, in advance, in the jump number table. The jump number table is stored in a memory of the CPU 109 or in the non-volatile memory 111.

More simply, a quotient obtained by dividing the total number N of images to be reproduced by a jump constant C recorded in the non-volatile memory 111 may be considered the number of images to be jumped. The jump constant C may be made variable through manipulation of a menu by a user, and the like.

After the number of images to be jumped is determined (Step S11), the CPU 109 determines whether the jump button 124 is turned on or off (Step S12). If it is determined in step S12 that the jump button 124 is off, the digital camera terminates the image jump shift operation and returns to the normal reproduction. If it is determined in Step S12 that the jump button 124 is on, the CPU 109 determines whether the image right shift button 123 is turned on or off (Step S13). If it is determined in Step S13 that the image right shift button 123 is on, the digital camera performs right shift jump reproduction (Step S15) and returns to Step S12. If it is determined in Step S13 that the image right shift button 123 is turned off, the CPU 109 determines whether the image left shift button 122 is turned on or off (Step S14). If it is determined in Step S14 that the image left shift button 122 is on, the digital camera performs left shift jump reproduction (Step S16), and returns to Step S12. If it is determined in Step S14 that the image left shift button 122 is off, the digital camera returns to Step S12.

In the right shift jump reproduction (Step S15), the J-th image to the end of the sequence of image files is reproduced and displayed. Then, if the latest image is jumped over, it might be acceptable either to return to the oldest image, jump across images for the number of missing ones and reproduce the J-th image, or to reproduce the latest image. Similarly, in the left shift jump operation (Step S16), the J-th image to the beginning of the sequence of image files is reproduced and displayed. Then, also, if the oldest image is jumped over, it might be acceptable either to return to the latest image, jump across images for the number of missing ones and reproduce the J-th image, or to reproduce the oldest image. In a multi-image display mode, images to be reproduced in jump reproduction are multi-displayed. The mode for multi-reproducing images to be jumped is referred to as a jump multi-reproduction mode.

Figure 3:
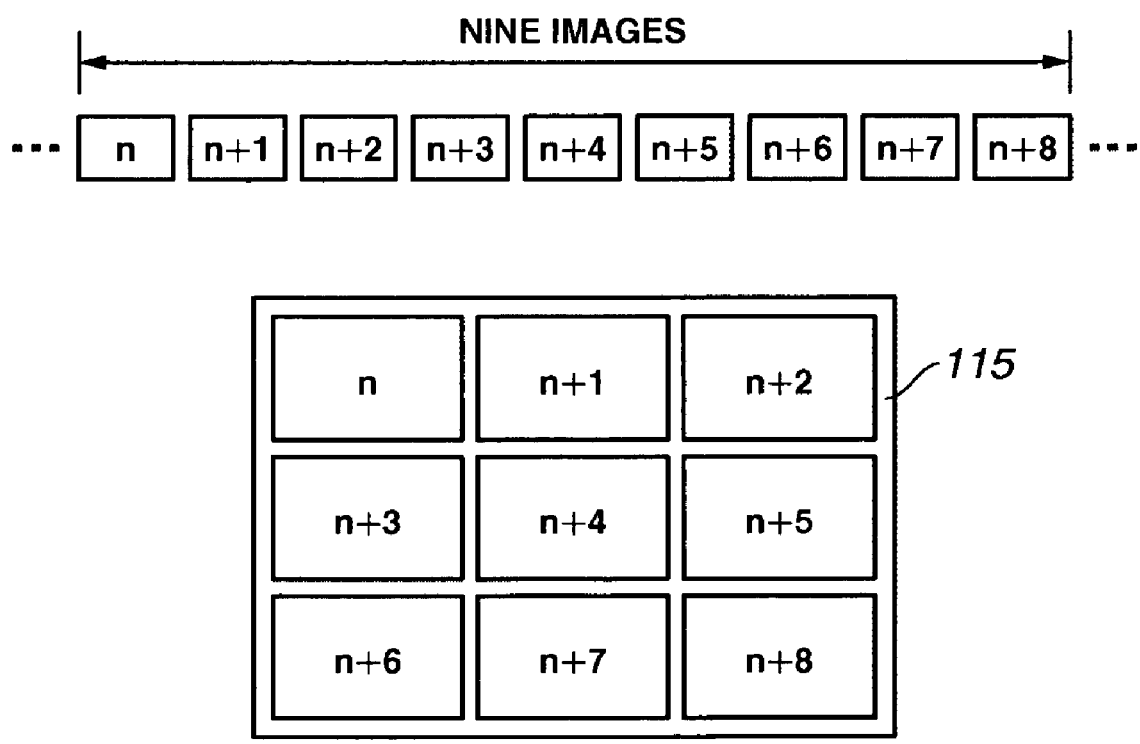
FIG. 3 illustrates a display example of normal multi-reproduction.

The multi-image display in the normal reproduction mode and in the jump reproduction mode is briefly described next. FIG. 3 shows the sequence of image files in the normal reproduction mode and an example of the multi-image display. FIG. 4 shows the sequence of image files in the jump reproduction mode and an example of the multi-image display.

When a user presses the multi-display button 125 in the normal reproduce mode, as shown in FIG. 3, nine images recorded on the non-volatile memory 111 are contemporaneously reproduced and sequentially displayed on the screen of the EVF 115 in the order starting with the top left. For instance, an image n to an image n+8 are contemporaneously displayed.

On the one hand, when the user presses the multi-display button 125 in the jump reproduction mode, reproduction is performed as shown in FIG. 4. In other words, nine images n, n+j*1 to n+j*8 to be reproduced during the jump reproduction in the order from an image at the starting point (an image n, in FIG. 4) are contemporaneously reproduced and displayed on the screen of the EVF 115.

Figure 5:
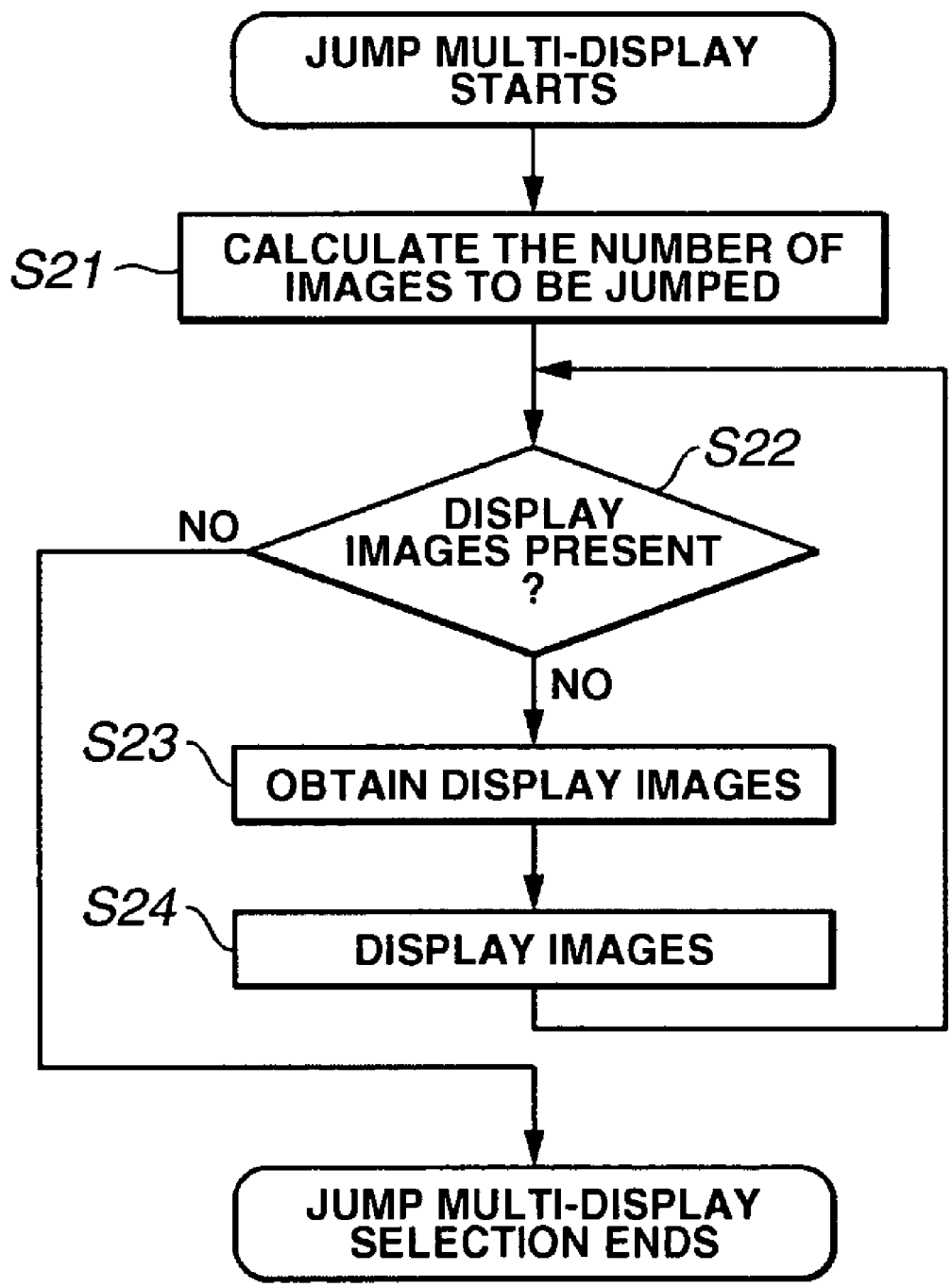
FIG. 5 is a flow chart illustrating jump multi-reproduction display.

FIG. 5 is a flow chart illustrating a case where multi-image display is performed in the jump reproduction mode, i.e., a flow chart of operations in the jump multi-reproduction mode.

First, with the same method as in Step S11, the number of images to be jumped is determined (Step S21). When the number of images to be jumped is determined (Step S21), an image to be displayed is searched for and it is determined whether there is any image to be displayed (Step S22). If it is determined in Step S22 that there is an image to be displayed, the digital camera reads the searched-for image from the memory card 121, obtains the display image (Step S23) and displays it on the EVF 115 (Step S24), and then returns to Step S22. In other words, the digital camera repeats steps S23 and S24 as long as there is a display image (Step S22).

If it is determined in Step S22 that there is no display image, the digital camera terminates the jump multi-reproduction.

In Step S21 of FIG. 5, as in Step S11, the digital camera considers a quotient obtained by dividing the total number N of images to be reproduced by the jump constant C as the number of images to be jumped. The jump constant C may be made variable through manipulation of a menu operation by a user.

As described above, the number of images to be jumped is determined according to the total number of frames in image files recorded on a recording medium. Accordingly, the number of images to be jumped will increase if the total number of frames increases. On the other hand, the number of images to be jumped will decrease if the total number of frames decreases. Consequently, a user can view a desired image file with a fewer number of operations. In addition, the number of images to be jumped is calculated with a quotient of "the total number of frames÷C". Accordingly, the number of images to be jumped can be set such that the jump reproduction takes place C times in a single direction, which makes almost one cycle of all images.

In addition, if the total number of frames is large, the number of images to be jumped will also be large, while the number of images to be jumped will be small if the total number of frames is small. Thus, when compared with the case in which the fixed number of images to be jumped is set, a user can come close to a desired image file with a fewer number of operations on average, which improves convenience for the digital camera of the user.

In the jump multi-reproduction, since a plurality of images recorded at intervals of the number of images to be jumped can be viewed at a glance, a user can more easily, yet briefly, search for a desired image.

Second Embodiment

Figure 6:
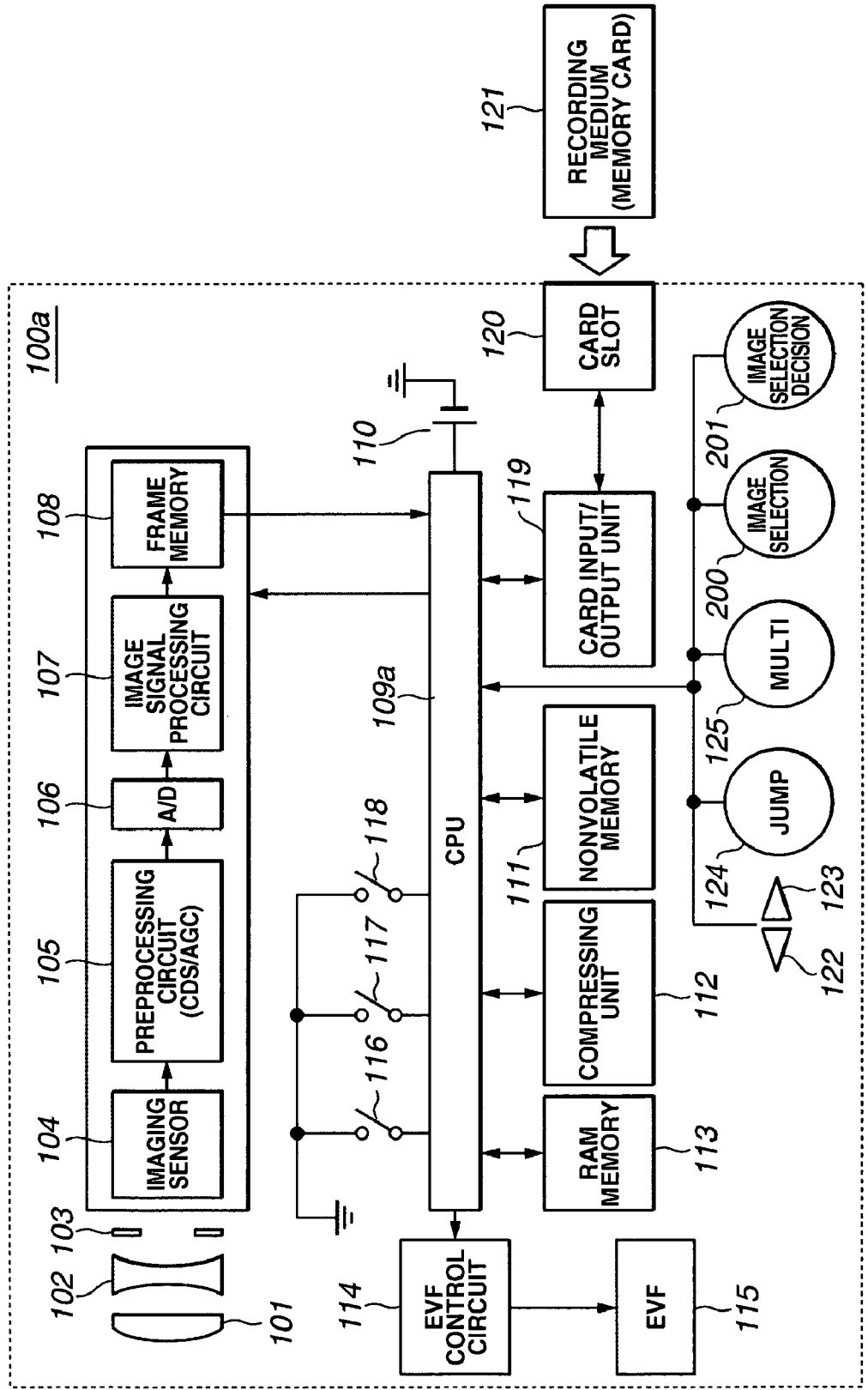
FIG. 6 is a block diagram of a digital camera according to a second embodiment.
Figure 7:
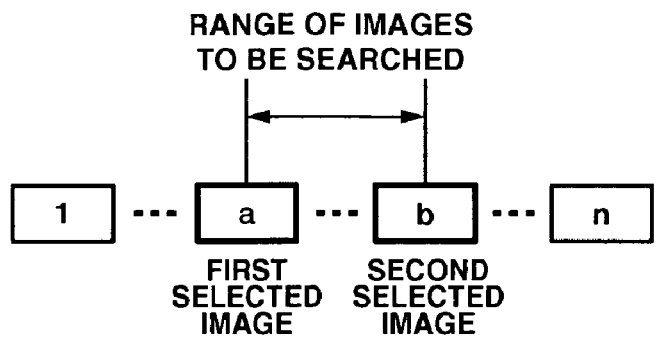
FIG. 7 illustrates an example of image selection in the second embodiment.

FIG. 6 is a block diagram of a digital camera according to a second embodiment of the present invention. In the second embodiment, as shown in FIG. 7, two images are optionally selected from a plurality of images recorded in order, and the number of images to be jumped is determined based on the total number of images between the two selected images. A digital camera body 100a shown in FIG. 6 additionally includes an image selection button 200 and an image selection decision button 201. A CPU 109a operates as described below according to the image selection button 200 and the image selection decision button 201. Elements having similar functions as those shown in FIG. 1 are denoted by the same reference numerals. The image selection button 200 and the image selection decision button 201 turn on when they are pressed.

Figure 8:
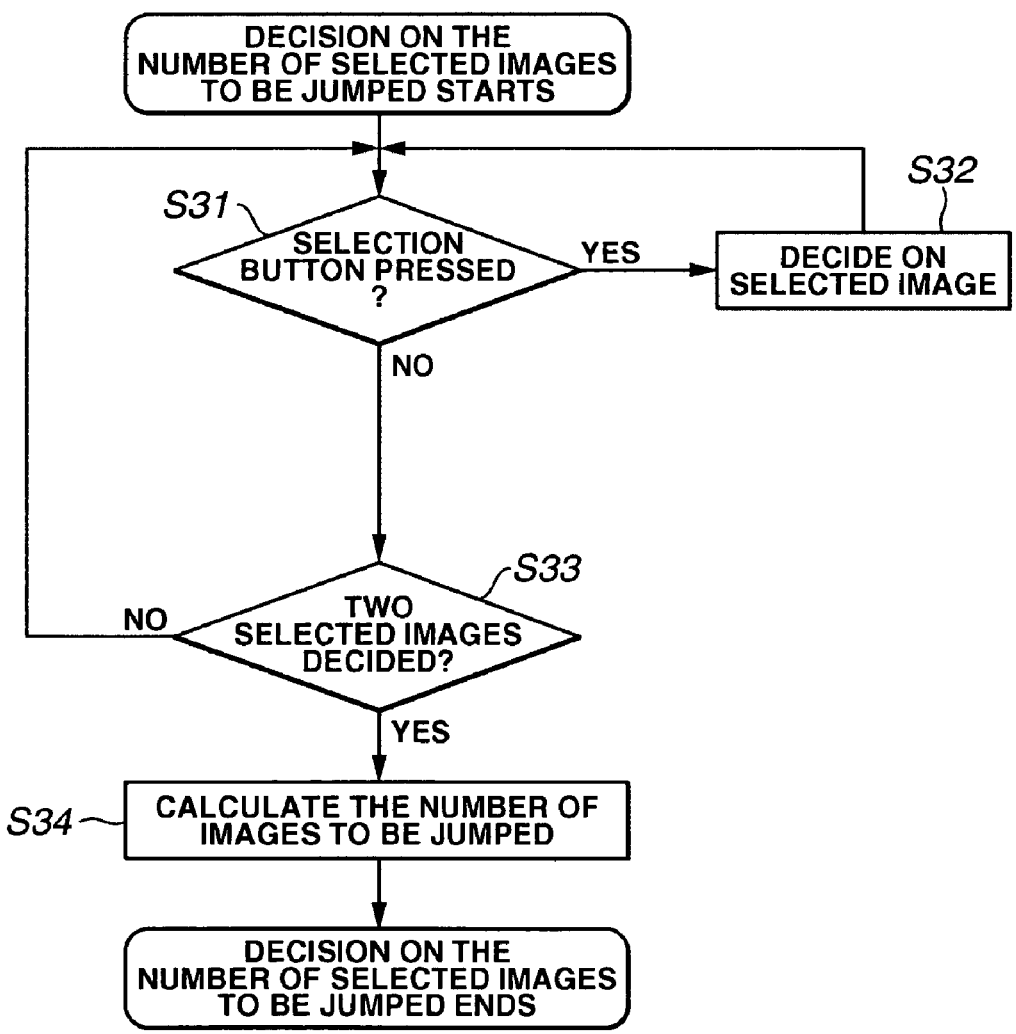
FIG. 8 is a flow chart illustrating determination of the number of images to be jumped by using image selection.

FIG. 8 is a flow chart illustrating determining the number of images to be jumped using image selection in the configuration shown in FIG. 6.

It is determined whether the image selection button 200 is turned on or off (Step S31). If it is determined in Step S31 that the image selection button 200 is on, one image is selected from recorded images and determined with the image selection decision button 201 (Step S32). The CPU 109a stores the determined image as one of the two images to be selected. Repeating Steps S31 and S32 two times or more, the user can determine the range of images subject to multi-image display. If the user makes selections three times or more, selected images in the last two selections will be used.

If it is determined in Step S33 that the user is not satisfied with the two selected images determined in Steps S31 and S32, steps S31 and S32 are repeated. If it is determined in Step S33 that the user is satisfied with the two selected images determined in Steps S31 and S32, the number of images between the two selected images is counted. Based on the counted number of images, the number of images to be jumped is calculated (Step S34). Then, the flow of determining the number of selected images to be jumped is terminated.

Using the number of images to be jumped thus determined, the user performs jump reproduction or jump multi-reproduction described in the first embodiment on all of the images or images between the two selected images. If all of the images are involved, the two selected images are used only to determine the number of images to be jumped. If images between the two selected images are involved, the two selected images are used to specify the range of reproduction while they are used to determine the number of images to be jumped.

For instance, determining two selected images in jump reproduction or jump multi-reproduction described in the first embodiment, and determining the number of images to be jumped for jump reproduction based on the number of images between the two determined images, the user can view images while gradually narrowing down the range of reproduction. Therefore, even if the number of images increases, the user can easily search for a desired image.

In addition, in jump multi-reproduction, as the user can view at a glance a plurality of images at intervals of the number of images to be jumped, the user can more easily, yet briefly, search for a desired image. Compared with a case where the user views images by simply following the order, the user can search for a desired image extremely rapidly by determining the number of images to be jumped and the search range according to the present embodiment based on determining two images which designate both ends of a range including the desired image as the selected images. This effect becomes more pronounced as the number of images to be searched increases, thus improving user convenience considerably.

The user may select multiple groups with a different jump value being calculated for each group based on the number of images in the group. Such a determination of multiple groups may be based on user input and/or may be done automatically, for example by image date. For example, images stored on the recording medium 121 may include fifty images from a first date and three images from a second date. In such a case, the images may be divided into two separate groups based on the dates and a jump value may be determined for each group so that a small group is not entirely skipped over. Such an automatic grouping may also be determined in ways other than by date. For example, images may be compared with surrounding images and similar images may be put into the same group. When there is a substantial change between consecutive images, a new group is started.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-032066 filed Feb. 8, 2005, which is hereby incorporated by reference herein in its entirety.

What is claimed is:

1. An image reproducing method comprising:
   a reading out step of reading out a jump constant which is a predetermined value in jump reproduction of an image from a memory medium, the jump constant being an integer equal to 2 or greater than 2;
   a calculating step of calculating a number of images to be jumped in the jump reproduction based on a quotient obtained by dividing a number of images within a predetermined range recorded on a recording medium by the jump constant read out in the reading out step irrespective of a location of a currently reproduced image;
   an instructing step of instructing the jump reproduction; and
   a reproduction controlling step of controlling an image reproduction such that at every one instruction by the instructing step, an image distant from the currently reproduced image by the number of images to be jumped calculated in the calculating step is reproduced from among a plurality of images recorded on the recording medium and arranged in a specific order,
   wherein when the instruction by the instructing step is to jump forward in the specific order and when the currently reproduced image is an image within the predetermined range and a number of images from the currently reproduced image to a last image among the images within the predetermined range in the specific order is less than the number of images to be jumped calculated in the calculating step, the image reproduction is controlled in the reproduction controlling step such that an image which is distant forward in the specific order from a first image among the images within the predetermined range by a number of images corresponding to a difference between the number of images from the currently reproduced image to the last image and the number of images to be jumped calculated in the calculating step, is reproduced.

2. The image reproducing method according to claim 1, wherein the reading out step includes a changing step of, responsive to a user's instruction, changing the jump constant.

3. The image reproducing method according to claim 1, further comprising:
   a multi-reproduction instructing step of instructing a multi-reproduction in the jump reproduction; and
   a multi-reproduction step of controlling an image reproduction such that when the multi-reproduction is instructed in the multi-reproduction instructing step, one image is extracted in a single direction from among the images within the predetermined range arranged in a specific order at every number of images to be jumped calculated in the calculating step and a plurality of images thus extracted are contemporaneously reproduced.

4. The image reproducing method according to claim 1, wherein the images within the predetermined range include all of images recorded on the recording medium.

5. The image reproducing method according to claim 1, further comprising an image selecting step of selecting the images within the predetermined range from all of images recorded on the recording medium.

6. The image reproducing method according to claim 5, wherein the reproduction controlling step includes a step of reproducing an image specified by the number of images to be jumped among all of images recorded on the recording medium and displaying the reproduced image.

7. The image reproducing method according to claim 5, wherein the reproduction controlling step includes a step of reproducing an image specified by the number of images to be jumped from among the images within the predetermined range recorded on the recording medium and displaying the reproduced image.

8. The image reproducing method according to claim 1, wherein there is a plurality of predetermined ranges and wherein the calculating step calculates a respective number of images to be jumped in jump reproduction based on a number of images within each of the predetermined ranges recorded on a recording medium.

9. The image reproducing method according to claim 8, wherein the plurality of predetermined ranges are determined based on time of storing each of the images on the recording medium.

10. A storage medium for storing program code for the image reproducing method according to claim 1.

11. An image reproducing apparatus comprising:
    a reading out unit configured to read out a jump constant which is a predetermined value in jump reproduction of an image from a memory medium, the jump constant being an integer equal to 2 or greater than 2;
    a calculating unit configured to calculate a number of images to be jumped in the jump reproduction based on a quotient obtained by dividing a number of images within a predetermined range recorded on a recording medium by the jump constant read out in the reading out step irrespective of a location of a currently reproduced image;

an instructing unit configured to instruct the jump reproduction; and a reproduction controlling unit configured to control an image reproduction such that at every instruction from the instructing unit, an image distant from the currently reproduced image by the number of images to be jumped calculated by the calculating unit is reproduced from among a plurality of images recorded on the recording medium and arranged in a specific order, wherein when the instruction by the instructing unit is to jump forward in the specific order and when the currently reproduced image is an image within the predetermined range and a number of images from the currently reproduced image to a last image among the images within the predetermined range in the specific order is less than the number of images to be jumped calculated in the calculating unit, the image reproduction is controlled in the reproduction controlling unit such that an image which is distant forward in the specific order from a first image among the images within the predetermined range by a number of images corresponding to a difference between the number of images from the currently reproduced image to the last image and the number of images to be jumped calculated in the calculating unit, is reproduced.

12. The image reproducing apparatus according to claim 11, wherein the reading out unit includes a changing unit configured to, responsive to a user's instruction, change the jump constant.

13. The image reproducing apparatus according to claim 11, further comprising:
a multi-reproduction instructing unit configured to instruct a multi-reproduction in the jump reproduction; and
a multi-reproduction unit configured to control an image reproduction such that when the multi-reproduction is instructed in the multi-reproduction instructing unit, one image is extracted in a single direction from among the images within the predetermined range arranged in a specific order at every number of images to be jumped determined by the calculating unit and a plurality of images thus extracted are contemporaneously reproduced.

14. The image reproducing apparatus according to claim 11, wherein the images within the predetermined range include all of images recorded on the recording medium.

15. The image reproducing apparatus according to claim 11, further comprising an image selection unit configured to select the images within the predetermined range from all of images recorded on the recording medium.

16. The image reproducing apparatus according to claim 15, wherein the reproduction controlling unit is configured to reproduce an image specified by the number of images to be jumped from among all of images recorded on the recording medium and display the reproduced image.

17. The image reproducing apparatus according to claim 15, wherein the reproduction controlling unit is configured to reproduce an image specified by the number of images to be jumped among the images within the predetermined range recorded on the recording medium and display the reproduced image.

18. The image reproducing apparatus according to claim 11, wherein there is a plurality of predetermined ranges and wherein the calculating unit is configured to calculate a respective number of images to be jumped in jump reproduction based on a number of images within each of the predetermined ranges recorded on a recording medium.

19. The image reproducing apparatus according to claim 18, wherein the plurality of predetermined ranges are calculated based on time of storing each of the images on the recording medium.

20. An image reproducing method comprising:
a reading out step of reading out a jump constant which is a predetermined value in jump reproduction of an image from a memory medium, the jump constant being an integer equal 2 or greater than 2;
a calculating step of calculating a number of images to be jumped in the jump reproduction based on a quotient obtained by dividing a number of images within a predetermined range recorded on a recording medium by the jump constant read out in the reading out step irrespective of a location of a currently reproduced image; and
a multi-reproduction step of controlling an image reproduction such that one image is extracted in a single direction from among a plurality of images recorded on the recording medium and arranged in a specific order at every number of images to be jumped calculated in the calculating step and a plurality of images thus extracted are contemporaneously reproduced,
wherein when the jump reproduction includes a jump forward in the specific order and when the currently reproduced image is an image within the predetermined range and a number of images from the currently reproduced image to a last image among the images within the predetermined range in the specific order is less than the number of images to be jumped calculated in the calculating step, the image reproduction is controlled in the multi-reproduction controlling step such that an image which is distant forward in the specific order from a first image among the images within the predetermined range by a number of images corresponding to a difference between the number of images from the currently reproduced image to the last image and the number of images to be jumped calculated in the calculating step, is reproduced.

21. A storage medium for storing program code for the image reproducing method according to claim 20.

22. An image reproducing apparatus comprising:
a reading out unit configured to read out a jump constant which is a predetermined value in jump reproduction of an image from a memory medium, the jump constant being an integer equal 2 or greater than 2;
a calculating unit configured to calculate a number of images to be jumped in jump reproduction based on a quotient obtained by dividing a number of images within a predetermined range recorded on a recording medium by the jump constant read out by the reading out unit irrespective of a location of a currently reproduced image; and
a multi-reproduction unit configured to control an image reproduction such that one image is extracted in a single direction from among a plurality of images recorded on the recording medium and arranged in a specific order at every number of images to be jumped calculated by the calculating unit and a plurality of images thus extracted are contemporaneously reproduced,
wherein when the jump reproduction includes a jump forward in the specific order and when the currently reproduced image is an image within the predetermined range and a number of images from the currently reproduced image to a last image among the images within the predetermined range in the specific order is less than the number of images to be jumped calculated in the calculating unit, the image reproduction is controlled such that an image which is distant forward in the specific order from a first image among the images within the predetermined range by a number of images corresponding to a difference between the number of images from the currently reproduced image to the last image and the number of images to be jumped calculated in the calculating unit, is reproduced.

23. An image reproducing method according to claim 1, wherein when an instruction by the instructing step is to jump forward and if the currently reproduced image is within the predetermined range and is distant from a last image among the images within the predetermined range arranged in the specific order by less than the number of images to be jumped calculated in the calculating step, an image reproduction is controlled in the reproduction controlling step such that the last image is reproduced irrespective of the number of images to be jumped calculated in the calculating step.

24. An image reproducing method according to claim 1, wherein when the instruction by the instructing step is to jump forward and if the currently reproduced image is within the predetermined range and is distant from a last image among the images within the predetermined range arranged in the specific order by less than the number of images to be jumped calculated in the calculating step, an image reproduction is controlled in the reproduction controlling step such that an image which is distant forward from a first image among the images within the predetermined range arranged in the specific order by a number of images corresponding to a difference between a number of images from the currently reproduced image to the last image and the number of images to be jumped calculated in the calculating step, is reproduced.

25. The image reproducing apparatus according to claim 11, wherein when an instruction by the instructing unit is to jump forward and if the currently reproduced image is within the predetermined range and is distant from a last image among the images within the predetermined range arranged in the specific order by less than the number of images to be jumped calculated by the calculating unit, an image reproduction is controlled by the reproduction controlling unit such that the last image is reproduced irrespective of the number of images to be jumped calculated by the calculating unit.

26. The image reproducing apparatus according to claim 11, wherein when the instruction by the instructing step is to jump forward and if the currently reproduced image is within the predetermined range and is distant from a last image among the images within the predetermined range arranged in the specific order by less than the number of images to be jumped calculated in the calculating step, an image reproduction is controlled in the reproduction controlling step such that an image which is distant forward from a first image among the images within the predetermined range arranged in the specific order by a number of images corresponding to a difference between a number of images from the currently reproduced image to the last image and the number of images to be jumped calculated in the calculating step, is reproduced.

27. An image reproducing method according to claim 1, further comprising a selecting step of selecting, based on a user's operation, a first image to be used as a start point of the predetermined range and a second image to be used as an end point of the predetermined range from among the plurality of images recorded on the recording medium and arranged in the specific order,
wherein, in the calculating step, a number of images between the first image and the second image selected in the selecting step is counted and used as a number of the images within the predetermined range recorded on the recording medium from among the plurality of images recorded on the recording medium and arranged in the specific order, and
wherein, in the reproduction controlling step, the image reproduction is controlled such that at every one instruction by the instructing step, an image distant from the currently reproduced image by the number of images to be jumped calculated in the calculating step is reproduced from among the plurality of images recorded on the recording medium and arranged in the specific order, even when the currently reproduced image is not one of the images between the first image and the second image selected in the selecting step from among the plurality of images recorded on the recording medium and arranged in the specific order.

* * * * *